(12) United States Patent
Bialas et al.

(10) Patent No.: US 6,312,631 B1
(45) Date of Patent: Nov. 6, 2001

(54) USE OF AMPHIPHILES FOR PERMANENT IMPROVEMENT OF COLORANT COMPATIBILITY OF POLYOLEFIN-BASED SHAPED BODIES, FIBERS AND FILMS

(75) Inventors: Norbert Bialas, Dormagen; Paul Birnbrich, Solingen; Herbert Fischer, Duesseldorf; Joerg-Dieter Klamann, Bremerhaven; Raymond Mathis, Duesseldorf, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/381,782

(22) PCT Filed: Mar. 16, 1998

(86) PCT No.: PCT/EP98/01506

§ 371 Date: Jan. 13, 2000

§ 102(e) Date: Jan. 13, 2000

(87) PCT Pub. No.: WO98/42767

PCT Pub. Date: Oct. 1, 1998

(30) Foreign Application Priority Data

Mar. 25, 1997 (DE) ............................... 197 12 378

(51) Int. Cl.⁷ ........................... B29C 43/24; B29C 45/00; B29C 47/00; C08K 5/34; C08L 23/02
(52) U.S. Cl. ................................ 264/78; 8/497; 264/175; 264/211; 264/328.17; 524/86; 524/106; 524/197; 524/366; 524/407; 524/413; 524/583; 524/584; 524/585; 524/586
(58) Field of Search .............................. 264/78, 175, 211, 264/328.17; 8/497; 524/86, 106, 197, 366, 407, 413, 583, 584, 585, 586

(56) References Cited

U.S. PATENT DOCUMENTS

| | | |
|---|---|---|
| 3,284,428 | 11/1966 | Turbak et al. . |
| 3,314,813 | 4/1967 | Maxion . |
| 3,424,716 | 1/1969 | Noshay et al. . |
| 4,836,901 | 6/1989 | Manabe et al. . |
| 5,045,387 | 9/1991 | Schmalz . |

FOREIGN PATENT DOCUMENTS

| | | |
|---|---|---|
| 36 30 330 | 3/1987 | (DE) . |
| 0 372 890 | 6/1990 | (EP) . |
| 0 595 408 | 5/1994 | (EP) . |
| 0 616 622 | 9/1994 | (EP) . |
| WO93/12171 | 6/1993 | (WO) . |
| WO97/12694 | 4/1997 | (WO) . |

OTHER PUBLICATIONS

Journal of Applied Polymer Science, vol. 62, pp. 235–245 (1996).
Veredeln von Kunst–stoff–Oberflaechen, pp. 136–139 (1974).
Ullmanns Encyclopaedia der Techneschen Chemie, vol. 11, pp. 138–139 (undated).
Fat.Sci.Technol., vol. 1, pp. 13–19 (1991).

*Primary Examiner*—Leo B. Tentoni
(74) *Attorney, Agent, or Firm*—John E. Drach; Steven J. Trzaska

(57) ABSTRACT

A polyolefin composition having enhanced dyeing capabilities containing: (a) a polyolefin; (b) from 0.01 to 10% by weight, based on the weight of the polyolefin in, of a migratable amphiphile, excluding phenolic and sulfur-containing stabilizers and n-octyl phenyl salicylate; and (c) from 0.01 to 1000 ppm of a transition metal, based on the weight of the polyolefin.

20 Claims, No Drawings

USE OF AMPHIPHILES FOR PERMANENT IMPROVEMENT OF COLORANT COMPATIBILITY OF POLYOLEFIN-BASED SHAPED BODIES, FIBERS AND FILMS

BACKGROUND OF THE INVENTION

This invention relates to the use of amphiphiles for permanently improving the dye compatibility of polyolefin-based moldings, fibers and films.

In many cases, the surface of plastic products has to be provided with three-dimensional, color or other effects which either can only be produced in completely, if at all, during the forming process for technical reasons or can only be inelegantly produced for economic reasons.

This applies, for example, to the dyeing and printing of the surfaces of polyolefin-based moldings, fibers and films. On account of their non-polar character, high molecular weight hydrocarbons, such as polyethylene or polypropylene, have a low surface tension (typically of the order of 20 to $30 \times 10^{-5}$ Ncm$^{-1}$. The adhesion of printing inks and dyes to their surface is correspondingly weak (typically below 0.5 Nmm$^{-2}$).

It is known from the prior art that the compatibility of plastic surfaces with can be improved, for example, by oxidative aftertreatment processes, such as corona or plasma treatment. In processes such as these, the surface of the plastic is oxidized or chemically modified in the presence of gases and discharges, so that certain surface properties of the plastic can be modified. However, apart from their high energy consumption, processes such as these always involve an additional step and lead to ozone emissions in the manufacture of plastic parts.

Chemical pretreatment processes, including for example treatment with fluorine or chlorine gas, with chromosulfuric acid or fluorosulfonic acid, etc., have also been known for some time.

In addition, special substances which were applied to the surface of the plastic to make the problematical dyeability of polyolefins more favorable were known from the earlier literature.

Thus, even U.S. Pat. No. 3,284,428 points out the dyes adhere very poorly to polyolefin fibers because the polyolefins have an inert surface. It is also pointed out that although polypropylene, for example, can be dyed, the dye absorption rate is far too low for industrial technical requirements. U.S. Pat. No. 3,284,428 proposes the use of nickel derivatives of special diamines to solve this problem.

U.S. Pat. No. 3,424,716 describes polyolefins to which ternary mixtures of nickel compounds, sulfo compounds and n-octylphenyl salicylate are added as additives in order to improve the dyeability and stability of the polyolefins.

EP-B-372 890 describes polyolefin- or polyester-based fibers with a lubricant applied to their surface. This lubricant comprises a mixture of (1) fatty acid diethanolamide, (2) a polyether-modified silicone, (3) a sorbitan fatty acid ester and (4) a metal salt of an alkyl sulfonate. Components (1) to (4) are present in special quantity ratios. According to page 3, lines 20 to 26, the mixture of components (1) to (4) is applied to the surface. The technique by which the mixture containing the four components is applied to the surface of fibers is described in detail on page 4, lines 6 to 9. The application techniques mentioned include a) the use of rollers, b) spraying and c) immersion. Accordingly, the process according to EP-B-372 890 is a process in which a mixture of components (1) to (4) is applied to the surface of polyolefin moldings in an additional processing step. Accordingly, the expression "applied to the fiber surface" used in claim 1 of EP-B-372 890 may be clearly interpreted by the expert to mean that any adhesion involved is loose and temporary, for example in the form of relatively weak adhesion forces, and cannot in any way to be considered to represent permanent anchorage.

Even the more recent literature (both patent documents and scientific publications) that the dyeability of polyolefins is extremely problematical. For example, EP-B-595 408 describes a process for improving the surface compatibility properties of polypropylene which comprises heat-treating polypropylene together with at least one olefin compound polybrominated at an aromatic ring in the absence of free radical initiators.

U.S. Pat. No. 5,045,387 describes the treatment of polyolefin-based fibers or films in which special polyalkoxylated polydimethyl siloxanes or alkoxylated ricinoleic acid derivatives are applied to the surface.

In a fairly recent Article, J. Akrman and J. Prikryl investigate the dyeing behavior of polypropylene fibers (cf. Journal of Applied Polymer Science 1996, Vol. 62, pages 235–245). The authors of this Article point out that the causes behind the poor dyeability of polypropylene have been known for some time and lie in the fact that the material has high crystallinity and an extremely non-polar aliphatic structure which does not contain any reactive sites. The authors also point out that although additives containing basic nitrogen are known from the prior art, no seriously commercial product which satisfactorily solves the dyeability problems is available to the expert despite the intensive research efforts in this field. The authors then report—on the basis of their own studies—that a polypropylene fiber dyeable in acidic medium can be obtained by adding a special high molecular weight additive containing basic nitrogen on a rigid polymer chain to the polymer before it is extruded.

In view of the very widely used traditional chemical aftertreatment processes, such as corona and plasma treatment, it is known to the expert that no exact statements can be made as to the various processes involved. However, it has been established that oxidative surface changes occur and result in the formation of certain "active centers". However, their concentration generally decreases with time so that the pretreatment effect also is only in evidence for a certain time, generally not more than 72 hours (cf. for example, Klaus Stoeckert (Editor), "Veredein von Kunststoff-Oberflächen", Munich 1974, page 137).

One feature common to all the known processes is that, in general, the desired surface effects are only temporarily present.

EP-B-616 622 relates to extrudable compostable polymer compositions comprising an extrudable thermoplastic polymer, copolymer or mixtures thereof containing a degradation-promoting system of an auto-oxidative component and a transition metal. The auto-oxidative system comprises a fatty acid, a substituted fatty acid or derivatives or mixtures thereof, the fatty acid having 10 to 22 carbon atoms and containing at least 0.1% by weight of unsaturated compounds and at least 0.1% by weight of free acid. The transition metal is present in the composition in the form of a salt in a quantity of 5 to 500 ppm and is selected from the group consisting of cobalt, manganese, copper, cerium, vanadium and iron. The composition is said to be oxidatively degradable to a brittle material in the form of a film around 100 microns thick over a period of 14 days at 60° C. and at a relative air humidity of at least 80%.

DESCRIPTION OF THE INVENTION

The problem addressed by the present invention was to provide auxiliaries with which the dye compatibility of polyolefin-based moldings, fibers and films could be lastingly and permanently improved.

There are no restrictions to the expression "dyes" as used in the context of the present invention. In principle, therefore, any natural and/or synthetic dyes familiar to the expert and, more particularly, the dyes traditionally used in the dyeing of textiles may be used for the purposes of the present invention. Of particular importance in this regard are the synthetic dyes which are normally divided into the following groups: basic dyes (also known as cationic dyes), mordant dyes, direct dyes (also known as substantive dyes), dispersion dyes, development dyes, oxidation dyes, color lakes, vat dyes, leuco vat dye esters, metal complex dyes, pigments, reactive dyes and acid dyes (cf. for example, Ullmanns Encyclopädie der technischen Chemie, 4th Edition, Vol. 11, Chapter entitled "Farbstoffe, synthetische", more particularly pages 138–139). All these dyes are specifically included in the scope of the present invention. Printing inks are also specifically regarded as dyes in the context of the present invention.

The present invention relates to the use of amphiphiles for permanently improving the dye compatibility of polyolefin-based moldings, fibers and films, characterized in that a mixture containing
a) predominantly one or more polyolefins,
b) 0.01 to 10% by weight, based on the polyolefins, of one or more migratable amphiphiles (additives I) and
c) 0.01 to 1000 ppm of one or more transition metal compounds (II)—metal content of the transition metal compounds (II) based on the polyolefins—
is subjected in the usual way to molding by extrusion, calendering, injection molding and the like at temperatures in the range from 180 to 320° C.

The additives according to the invention are also referred to hereinafter as additives (I). They are amphiphilic compounds. An amphiphile is understood in common usage to be a compound which combines hydrophilic and hydrophobic molecule parts. In other words, the molecular structure of amphiphiles contains as it were a "combination" of a suitable oleophilic basic molecule based on a hydrocarbon which contains one or more substituents of high polarity. The substituents of high polarity are formed in known manner by hetero atom-containing molecule constituents, particular significance being attributed in this regard to the hetero atoms oxygen, nitrogen and/or halogen for forming the functional group(s) of high polarity.

The use of the amphiphiles in accordance with the invention ensures that dyes are able permanently to adhere to or in the plastic without any additional pretreatment. Dye compatibility values once established remain intact for long periods or occasionally even increase in the event of continuing storage. It is specifically pointed out that, basically, the dyes adhere directly to or in the plastic, but not because they are present for example in an applied layer of paint or the like.

By adhesion "to or in the plastic" is meant that, although on the one hand the dyes adhere in the region of the plastic surface to which the migratable amphiphilic additives at least partly pass in the course of the molding process, on the other hand dyes can also diffuse into the interior of the plastic where they come into contact—in the sense of adhesion—with the additives present there.

The mixture containing components a), b) and c) is used by traditional molding techniques well-known to the expert, such as extrusion, calendering, injection molding and the like. In a preferred embodiment of the present invention, the melt of the mixture containing components a), b) and c) comes into contact with oxygen, more especially atmospheric oxygen, in the course of the molding process. In the case of extrusion, for example, this happens when the melt leaves the extruder through the extrusion die. The preferred embodiment mentioned above enables—optionally catalytically assisted—oxidative processes, for example oxidatively induced crosslinking—and hence ultimately immobilization—of olefinically unsaturated molecule constituents of the additives (I) to form relatively high molecular weight compounds, oxidatively induced oxidation of activated methylene groups which are present in the immediate neighborhood of the polar groups of the amphiphiles (I) and other oxidative reactions and secondary reactions to take place. (Atmospheric) oxygen can act on the one hand on the surface itself and, on the other hand, even in the interior of the plastic, especially in zones near the surface—to which it is capable of diffusing.

The additives (I) suitable for use in accordance with the present invention have relatively low molecular weights, a pre-requisite for reasonably rapid migration. An upper limit to the molecular weight of suitable internal additives (I) is at about 5,000 D (dalton), preferably at values of at most about 3,000 D and more preferably at maximum values of about 1,000 D. The expression of molecular weight in "daltons" is known to be the definition of the absolute molecular weight. Accordingly, by comparison with the polyolefins with their molecular weights of several million, the additives (I) are comparatively low molecular weight compounds. The lower limit to the molecular weight of these internal additives (I) is at about 50 to 100 D, preferably at 150 to 180 D and more preferably at around 200 to 300 D.

The use of the amphiphiles in accordance with the invention guarantees the compatibility of dyes subsequently applied with the polyolefin surface with virtually no time limit. The expression "with virtually no time limit" applies both to the time interval between production of the particular polyolefin-based molding and its surface dyeing in a separate process step and to the time interval between production of the dyed product and its practical application.

The preferred additives (I) according to the invention are amphiphiles of which the hydrophobic molecule parts at least partly contain olefinically unsaturated functions which are particularly readily accessible to radical-induced crosslinking reactions in the vicinity of the plastic surface. Preferred additives (I) are those which, in the unreacted state, have iodine values of at least about 10, preferably of at least about 30 to 40 and more preferably of at least about 45 to 50. The choice of the method by which the iodine value is determined is basically of minor importance. In the context of the present invention, however, reference is specifically made to the methods developed by Hanus and Wijs, which have long been part of Section C-V of the "DGF-Einheitsmethoden", and to the equivalent method developed by Fiebig (cf. Fat Sci. Technol. 1991, No. 1, pages 13–19).

As will be shown in more detail hereinafter, both monoolefinically unsaturated hydrocarbon radicals and polyolefinically unsaturated hydrocarbon radicals may be provided in the additives (I) used in accordance with the invention. Combinations of several corresponding compounds are also important auxiliaries for the use according to the invention. The iodine values of the additives (I) used may assume values above 80 to 90 and, more particularly, values above 100. Highly unsaturated additive components with iodine values of up to about 200 or even higher, for example in the range from 120 to 170, are auxiliaries in the context of the use according to the invention.

In the three-dimensional structure of their hydrocarbon radical, these internal additives (I) may be both straight-chained and branched and/or may have a cyclic structure.

Basically, suitable substituents of high polarity are functional groups which are distinguished in particular by a content of hetero atoms and preferably by a content of O, N and/or halogen. The expression "functional group" is used in its most general sense in the context of the present invention and is understood to apply to groups of atoms which have a characteristic reactivity and which contain one or more hetero atoms. Accordingly, this definition encompasses for example OH groups (simple atomic groups) or N-containing heterocycles (more complex atomic groups), but not C=C-double bonds (no hetero atom) per se, unless they are present in addition to the hetero atoms in more complex atomic groups. Groups from the following classes are mentioned purely by way of example: carboxyl, hydroxyl, amino, oxazoline, imidazoline, epoxide and/or isocyanate groups and/or derivatives thereof. The group of such derivatives includes, for example, ester groups, ether groups, amide groups/alkanolamine and/or alkanolamide groups.

A very important class of substituents of high polarity in the context of the present invention are N-containing heterocycles and/or derivatives thereof, for example pyridazine, pyrimidine, pyrazine, pyridine, azane and azinane groups. Thiazole, thiazolane, thiazolidine, pyrrole, azolane, azolidine, pyrazole and isooxazole groups are particularly suitable, imidazole, imidazoline, diazolidine, oxazoline, oxazole, oxazolidine and oxazolidane groups being most particularly suitable.

A particularly preferred class of additives (I) are compounds which, on the one hand, contain one or more olefinically unsaturated functions in the hydrophobic part of the molecule and, on the other hand, extremely polar functions, such as oxazoline, imidazoline, sulfonate, phosphonate or carboxyl groups (or salts thereof), in the hydrophilic part of the molecule.

Certain individually selected additives of the type mentioned in the foregoing and mixtures of several corresponding auxiliaries may be used as the additive (I). By suitably selecting the substituents of high polarity in the particular auxiliaries of this class of additives used, the dye compatibility to which the end product is to be adjusted can be influenced in a predetermined manner. However, mixtures of the type in question here are also corresponding mixtures which, so far as their functional group is concerned, can be assigned to a sub-class, i.e. for example contain carboxyl groups as substituents of high polarity, but contain different basic structures in their hydrocarbon molecule. It is known that corresponding mixtures are obtained in particular when mixtures of the type in question based on natural materials are used. For example, olefinically unsaturated fatty acid mixtures of vegetable and/or animal origin or derivatives thereof can form valuable additives of the additive (I) type in the context of the teaching according to the invention.

As known per se to the expert, different improvements in dye compatibility can be expected according to the particular groups of high polarity present. Relevant specialist knowledge may be applied in this regard.

Another possibility of varying the internal additives (I) according to the invention lies in the number of functional substituents of high polarity in the particular basic hydrocarbon skeleton. Even one substituent of high polarity can lead to the permanent and at the same time marked increase in dye compatibility required, especially after adaptation of the type and quantity of functional groups available. In addition, however, it has been found that the presence of two or more such substituents of high polarity in the particular molecule of the additive (I) can be an important additional feature for increasing dye compatibility. Reference is made here purely by way of example to the class of so-called dimer fatty acids. Dimer fatty acids are known among experts to be carboxylic acids obtainable by oligomerization of unsaturated carboxylic acids, generally fatty acids, such as oleic acid, linoleic acid, erucic acid and the like. The oligomerization is normally carried out at elevated temperature in the presence of a catalyst, for example of alumina. The products obtained are mixtures of various subtonics in which the dimerization products predominate. However, small amounts of higher oligomers, especially trimer fatty acids, are also present. Dimer fatty acids also contain monomers or monofunctional fatty acids from their production. Dimer fatty acids are commercially available products and are marketed in various compositions and qualities. In the same way as dimer fatty acids, trimer fatty acids are oligomerization products of unsaturated fatty acids in which the percentage content of trimers in the product predominates. Dimer and trimer fatty acids have olefinic double bonds which make them capable of reactive solidification in the vicinity of the polyolefin surface.

Dialkanolamines containing at least partly olefinically unsaturated hydrocarbon radicals or dialkanolamides of unsaturated fatty acids are extremely effective dye compatibility improvers in the context of the teaching according to the present invention. This applies in particular to the corresponding diethanol derivatives. This class includes, for example, oleic acid diethanolamide and linoleic acid diethanolamide. Specifically included in this connection are technical products known to the expert, including the secondary components normally occurring therein. Examples of such products are "Comperlan OD" (technical oleic acid diethanolamide) and "Comperlan F" (technical linoleic acid diethanolamide), both commercial products of Henkel KGaA. However, such compounds as sorbitan monoesters with, in particular, ethylenically unsaturated fatty acids also lead to optimal results in the context of the teaching according to the invention.

The migration rate to be expected from the molecular structure of the particular additives (I) used may be one of the factors which determines the quantity of additives (I) to be used in each individual case. Lower limits to the size of the additions of additive (I) to the polyolefin are about 0.01% by weight and, more particularly, about 0.1% by weight. In general, it will be advisable to use at least about 0.2 to 0.8% by weight (based on the polyolefins). Optimum dye compatibility values for the particular representatives of this class of substances used in each individual case as the additive (I) are generally achieved in the range from about 0.3 to 5% by weight and, more particularly, in the range from 0.4 to about 1% by weight.

As already mentioned, the optimum dye compatibility to be adjusted is understandably determined by the chemical nature and by the possible interaction of the substituents of high polarity and optionally reactivity in the additive (I). The choice of additive (I) to be used in each individual case is determined by the particular stresses likely to be applied in the end product to the strength of the bond between the polyolefin and the dye applied.

The combination of the teaching according to the invention which leads to high dye compatibility values with technologies known per se for improving dye compatibility on polyolefin surfaces falls within the scope of the teaching according to the invention. Thus, both mechanical and chemical and/or physical surface treatments of the outer polyolefin surface may be combined with the dye compatibility modifications according to the invention. However, this is generally not necessary.

As already mentioned, the additives (I) are used in combination with transition metal compounds (II) during the molding of the polyolefins. The quantity of transition metal compound (II)—metal content of the transition metal compound (II) based on the polyolefins—is in the range from 0.1 to 1000 ppm. Basically, there are no particular restrictions in regard to the nature of the transition metal compounds (II). In principle, therefore, any transition metal compounds known to the expert may be used for the purposes of the teaching according to the invention. In one embodiment, transition metal salts, preferably salts based on organic acids containing 8 to 22 carbon atoms, are used as the transition metal compounds (II). In another embodiment, the transition metals are selected from the group consisting of lead, nickel, zirconium, chromium, titanium and tin. In another embodiment, the transition metal compounds are used in a quantity of less than 5 ppm—metal content of the transition metal compound (II) based on the polyolefins. Instead of or in addition to the metals just mentioned, cobalt, copper, iron, vanadium, cerium and magnesium, for example, may also be used.

If desired, other compounds known to the expert as catalysts for oxidative processes may be used in addition to the compulsory transition metal compounds (II) mentioned.

In one preferred embodiment, the ratio by weight of the additives (I) to the metal content of transition metal compounds (II) is adjusted to a value of 10:0.1 to $10:10^{-7}$, preferably to a value of 10:0.02 to $10:10^{-6}$ and more preferably to a value of 10:0.01 to $10:10^{-5}$.

In the light of the teaching of EP-B-616 622 cited earlier on, the following observations may be made:

The teaching of the present invention on the one hand ensures that the improved and permanent dye compatibility required is achieved and, on the other hand, that it is achieved without any adverse effect on other material parameters.

In one preferred embodiment, the transition metal compounds (II) are used in combination with additives (I) selected from the class of diethanolamides of unsaturated fatty acids. As already mentioned, the diethanolamides are preferably used as technical products.

According to the invention, the amphiphilic additives (I) are used in the course of routine molding processes, such as extrusion, calendering, injection molding and the like. It may be desirable to use components a), b) and c) in the form of a mixture prepared in advance. Other typical auxiliaries which have generally been successful in the molding of plastics and which are known to the expert, for example slip agents, antistatic agents, lubricants, release agents, UV stabilizers, antioxidants, fillers, fire retardants, mold release agents, nucleating agents and antiblocking agents, may also be separately made up and added during the final mixing of the end products. However, it may also be desirable, for example where extrusion is applied, to introduce components b) and/or c) and/or other additives either completely or partly into the polyolefin melt itself in the extruder, so that the mixture of components a), b) and c)—and optionally other auxiliaries—is not present from the outset as a made-up product, but is formed in the extruder itself. A technique such as this is appropriate, for example, when the additives (I) to be added to the polymer melt are present in liquid form and are easier to inject than to make up in advance.

It may even be desirable, although not necessary for obtaining the effect according to the invention, to undertake a conventional corona or plasma treatment after the use of components a) to c) in accordance with the invention.

Basically, any known ethylene- or propylene-based polymers and copolymers may be used as the basic oleophilic polyolefin material.

Mixtures of pure polyolefins with copolymers are also suitable in principle providing the additives (I) retain their ability to migrate in accordance with the invention and hence to collect at the surfaces of solids. Polymers particularly suitable for the purposes of the teaching according to the invention are listed below: poly(ethylenes), such as HDPE (high-density polyethylene), LDPE (low-density polyethylene), VLDPE (very-low-density polyethylene), LLDPE (linear low-density polyethylene), MDPE (medium-density polyethylene), UHMPE (ultrahigh molecular polyethylene), VPE (crosslinked polyethylene), HPPE (high-pressure polyethylene); isotactic polypropylene; syndiotactic polypropylene; Metallocen-catalyzed polypropylene, high-impact polypropylene, random copolymers based on ethylene and propylene, block copolymers based on ethylene and propylene; EPM (poly[ethylene-co-propylene]); EPDM (poly[ethylene-co-propylene-co-conjugated diene]).

Other suitable polymers are: poly(styrene); poly(methylstyrene); poly(oxymethylene); Metallocen-catalyzed α-olefin or cycloolefin copolymers, such as norbornene/ethylene copolymers; perfluorinated polyolefins, polyvinyl chloride, acrylonitrile/butadiene/styrene copolymers (ABS), styrene/butadiene/styrene or styrene/isoprene/styrene copolymers (SIS or SBS); copolymers containing at least 80% ethylene and/or styrene and less than 20% monomers, such as vinyl acetate, acrylates, methacrylates, acrylic acid, acrylonitrile, vinyl chloride. Examples of such polymers are: poly(ethylene-co-ethyl acrylate), poly(ethylene-co-vinyl acetate), poly(ethylene-co-vinyl chloride), poly(styrene-co-acrylonitrile). Also suitable are graft copolymers and polymer blends, i.e. mixtures of polymers in which the above-mentioned polymers inter alia are present, for example polymer blends based on polyethylene and polypropylene.

Homopolymers and copolymers based on ethylene and propylene are particularly preferred for the purposes of the present invention. In one embodiment of the present invention, therefore, polyethylene on its own is used as the polyolefin; in another embodiment, polypropylene on its own is used as the polyolefin and, in a further embodiment, ethylene/propylene copolymers are used as the polyolefin.

The surface-modified polyolefin-based moldings and films obtained by the process according to the invention can be printed and dyed by any of the relevant methods known to the expert. Traditional acidic, basic or reactive wool or cotton dyes are preferably used for dyeing.

The present invention also relates to a process for the production of dyed and/or printed polyolefin-based moldings, fibers and films, characterized in that a mixture containing a) predominantly one or more polyolefins,
b) 0.01 to 10% by weight, based on the polyolefins, of one or more migratable amphiphiles (additives I) and
c) 0.01 to 1000 ppm of one or more transition metal compounds (II)—metal content of the transition metal compounds (II) based on the polyolefins, is conventionally molded by extrusion, calendering, injection molding and the like at temperatures of 180 to 320° C. and the resulting polyolefin-based moldings, fibers and films with improved dye compatibility are then printed and/or dyed by conventional methods.

The following Examples are intended to illustrate the invention without limiting it in any way.

EXAMPLE

1. Materials Used
1.1. Polyolefin
In all the tests, a granular polypropylene ("Hostalen PPH 2150", a product of Hoechst AG) was used as the high molecular weight polyolefin.

1.2. Additives (I)
Soya oxazoline: oxazoline of soya fatty acids (technical quality) ("Loxamid VEP 8514", a product of Henkel KGaA, Düsseldorf)
Ricinol oxazoline: oxazoline of castor oil fatty acid (technical quality) ("Loxamid VEP 8513", a product of Henkel KGaA, Düsseldorf)
Comperlan F: linoleic acid diethanolamide, technical quality ("Comperlan F", a product of Henkel KGaA, Düsseldorf)
Edenor HTiCT: selectively hydrogenated tallow fatty acid ("Edenor HTiCT", a product of Henkel KGaA, Düsseldorf)

1.3. Transition Metal Compounds (II)
Pb-C8: lead-2-ethylhexanoate (lead salt of 2-ethylhexanoic acid)
Ni-acac: nickel acetyl acetonate
Cu-sol: mixture containing 62% copper(II) salts of branched $C_{6-19}$ fatty acids and Cu(II) naphthenate and 9% $C_{3-24}$ fatty acids and 35% by weight naphtha ("Cu-Soligen", a product of Borchers GmbH)

1.4. Other Substances
Dye 1 commercial acid dye ("Supracen Rot 3B 200%", a product of Bayer AG)
Dye 2 commercial reactive dye ("Levafix Brillantrot E-4BA", a product of Bayer AG)
Dye 3 commercial basic dye ("Astrazonrot 6B", a product of Bayer AG)

2. Production of Surface-modified Polypropylene by the Process According to the Invention In order to test the dye compatibility properties of surface-modified polypropylene, polypropylene was initially produced in tape form by mixing 600 g of polypropylene granules with 9.0 g (=1.5%) of additive (I) and 0.38 g of transition metal compound (II). The particular additive (I) and transition metal compound (II) used are shown in Tables 1 to 3 below. The mixtures were introduced through a hopper into an extruder. A Brabender DSK 42/7 twin-screw extruder (Brabender OHG, Duisberg) was used.

As well-known to the expert, an extruder is a machine for processing plastics in which both powder-form and granular thermoplastics can be continuously mixed and plasticized.

Beneath the feed hopper, there is a contra-rotating twin screw longitudinally divided into three heating zones in addition to a water-cooling system which is intended to prevent premature melting of the granules or powder. The temperature of the heating zones and the rotational speed of the twin screws can be controlled through a data-processing Plast-Corder PL 2000 which is connected to the extruder via a PC interface.

To produce the polypropylene tapes, the following temperatures were adjusted: heating zone I 250° C., heating zone II 270° C., heating zone III 290° C., the three heating zones being air-cooled to keep the temperatures constant.

The polypropylene granules (including the particular additive I and the transition metal compound II) were automatically taken into the extruder by the contra-rotating twin screws and transported along the screw. The rotational speed was 25 r.p.m. This guaranteed a relatively long residence time in the extruder and hence thorough compounding and homogenization. The resulting homogeneous and substantially bubble-free mixture finally entered a nozzle which represents a fourth heating zone. The temperature of the nozzle was 300° C., i.e. the particular mixture left the extruder at that temperature.

After leaving the nozzle, the hot mixture flowed onto a conveyor belt of which the speed was adjusted so that a smooth and uniformly thick and wide tape was formed on cooling in air. In the tests described here, the speed was adjusted so that the polypropylene tape was about 35 mm wide and about 0.35 mm thick. Square test specimens were die-cut from this material and used for the dyeing tests described hereinafter.

Test specimens of pure polypropylene were used for comparison purposes. They were produced by the extrusion technique just described, except that polypropylene granules on their own, i.e. with no additive I or transition metal compound II added, were used. The test results based on this material are identified in Tables 1 to 3 by the abbreviation "Comp." In the first column.

3. Dyeing Tests with Acid Dye
3.1. Preparation of the Dyeing Solution A Beginning at 50° C., Supracen Rot (dye "Dye 1") was added to 1 liter of water in such a quantity that the concentration of the dye was 1.5%. 1.5 g of sodium sulfate calc. was then added, a pH value of 2 to 3.5 was adjusted with 85% formic acid and the whole was heated to boiling temperature at a rate of about 2° C. per minute. The dyeing solution thus prepared was used to test the dye compatibility of polypropylene test specimens.

3.2. Dyeing and Evaluation

Untreated polypropylene test specimens and polypropylene test specimens surface-modified in accordance with the invention were first stored for 1 to 7 days at 20 to 60° C. and then immersed for 60 minutes in the dyeing solution prepared in accordance with 3.1, the boiling temperature being maintained. The test specimens were then removed from the bath and rinsed with water first for 5 minutes at 50° C. and then for another 5 minutes at 20° C. The dyeing results were visually evaluated by a panel of examiners using a "school marking system". The individual values ("marks") have the following meanings: 1=very good, 2=good, 3=satisfactory, 4=adequate, 5=poor, 6=inadequate. The value "1" corresponds to the mark awarded in the corresponding dyeing of cotton while the value "6" corresponds to the mark awarded in the dyeing of untreated polypropylene.

The test results are set out in Table 1 below. All the results are average values from five tests.

TABLE 1

Dyeing tests with acid dye (dyeing solution A)

| No. | Additive (I) | Transition metal compound II | Storage Days | ° C. | Dye | Result (mark) |
|---|---|---|---|---|---|---|
| Comp. | None | None | 1 | 20 | Dye 1 | 6 |
| Comp. | None | None | 6 | 20 | Dye 1 | 6 |
| Comp. | None | None | 1 | 60 | Dye 1 | 6 |
| Comp. | None | None | 6 | 60 | Dye 1 | 6 |
| B1 | Soya oxazoline | Pb-C8 | 2 | 20 | Dye 1 | 1 |
| B2 | Soya oxazoline | Pb-C8 | 7 | 60 | Dye 1 | 1 |
| B3 | Soya oxazoline | Niacac | 3 | 20 | Dye 1 | 1 |
| B4 | Soya oxazoline | Niacac | 7 | 60 | Dye 1 | 1 |
| B5 | Soya oxazoline | Cu-sol | 2 | 20 | Dye 1 | 1 |

TABLE 1-continued

Dyeing tests with acid dye (dyeing solution A)

| No. | Additive (I) | Transition metal compound II | Storage Days | ° C. | Dye | Result (mark) |
|---|---|---|---|---|---|---|
| B5 | Soya oxazoline | Cu-sol | 7 | 60 | Dye 1 | 1 |
| B6 | Ricinol oxazoline | Pb-C8 | 2 | 20 | Dye 1 | 2 |
| B7 | Ricinol oxazoline | Pb-C8 | 7 | 60 | Dye 1 | 2 |
| B8 | Ricinol oxazoline | Niacac | 3 | 20 | Dye 1 | 2 |
| B9 | Ricinol oxazoline | Niacac | 7 | 60 | Dye 1 | 2 |
| B10 | Ricinol oxazoline | Cu-sol | 2 | 20 | Dye 1 | 2 |
| B11 | Ricinol oxazoline | Cu-sol | 7 | 60 | Dye 1 | 1 |
| B12 | Comperlan F | Cu-sol | 1 | 20 | Dye 1 | 3 |
| B13 | Comperlan F | Cu-sol | 6 | 60 | Dye 1 | 2 |
| B14 | Comperlan F | Pb-C8 | 6 | 60 | Dye 1 | 3 |
| B15 | Comperlan F | Niacac | 6 | 60 | Dye 1 | 3 |
| B16 | Edenor HTiCT | Cu-sol | 1 | 20 | Dye 1 | 3 |
| B17 | Edenor HTiCT | Cu-Sol | 6 | 60 | Dye 1 | 4 |
| B18 | Edenor HTiCT | Pb-C8 | 1 | 20 | Dye 1 | 3 |
| B19 | Edenor HTiCT | Pb-C8 | 6 | 60 | Dye 1 | 4 |

4. Dyeing Tests with Reactive Rye
4.1. Preparation of the Dyeing Solution B Beginning at 25° C., 50 g of sodium sulfate calc. were added to 1 liter of water. After 5 minutes, 5 g of sodium bicarbonate were added, after another 5 minutes 5 g of soda were added and, after another 5 minutes, Levafix Brillantrot E-4BA (dye "Dye 2") was added in such a quantity that the concentration of the dye was 1.5%. The solution was then heated to 60° C. at a rate of about 2° C. per minute. The dyeing solution thus prepared was used to test the dye compatibility of polypropylene test specimens.

4.2. Dyeing and Evaluation

Untreated polypropylene test specimens and polypropylene test specimens surface-modified in accordance with the invention were first stored for 1 to 8 days at 20 to 60° C. and then immersed for 45 minutes in the dyeing solution prepared in accordance with 4.1, the boiling temperature being maintained. The test specimens were then removed from the bath and rinsed with water first for 5 minutes at 50° C. and then for another 5 minutes at 20° C. The dyeing results were visually evaluated by a panel of examiners using a "school marking system". The individual values ("marks") have the following meanings: 1=very good, 2=good, 3=satisfactory, 4=adequate, 5=poor, 6=inadequate. The value "1" corresponds to the mark awarded in the corresponding dyeing of cotton while the value "6" corresponds to the mark awarded in the dyeing of untreated polypropylene.

The test results are set out in Table 2 below. All the results are average values from five tests.

TABLE 2

Dyeing tests with reactive dye (dyeing solution B)

| No. | Additive (I) | Transition metal compound II | Storage Days | ° C. | Dye | Result (mark) |
|---|---|---|---|---|---|---|
| Comp. | None | None | 1 | 20 | Dye 2 | 6 |
| Comp. | None | None | 6 | 20 | Dye 2 | 6 |
| Comp. | None | None | 1 | 60 | Dye 2 | 6 |
| Comp. | None | None | 6 | 60 | Dye 2 | 6 |
| B20 | Soya oxazoline | Pb-C8 | 8 | 60 | Dye 2 | 2 |
| B21 | Soya oxazoline | Niacac | 8 | 60 | Dye 2 | 3 |

TABLE 2-continued

Dyeing tests with reactive dye (dyeing solution B)

| No. | Additive (I) | Transition metal compound II | Storage Days | ° C. | Dye | Result (mark) |
|---|---|---|---|---|---|---|
| B22 | Soya oxazoline | Cu-sol | 8 | 60 | Dye 2 | 2 |
| B24 | Ricinol oxazoline | Pb-C8 | 8 | 60 | Dye 2 | 2 |
| B25 | Ricinol oxazoline | Niacac | 8 | 60 | Dye 2 | 2 |
| B26 | Ricinol oxazoline | Cu-sol | 8 | 60 | Dye 2 | 2 |

5. Dyeing Tests with Basic Dye
5.1. Preparation of Dyeing Solution C

Astrazonrot 6B (dye "Dye 3") was made into a paste by stirring with 60% acetic acid at 20° C. The two components were used in a quantity which, after subsequent addition to the aqueous matrix, produced a concentration of 1.5% of each component, based on the aqueous matrix.

Beginning at 50° C., 100 g of sodium sulfate was first added, followed after 5 minutes by the dye made into a paste with acetic acid. The whole was then heated to boiling temperature at a rate of about 2° C. per minute. The dyeing solution thus prepared was used to test the dye compatibility of polypropylene test specimens.

5.2. Dyeing and Evaluation

Untreated polypropylene test specimens and polypropylene test specimens surface-modified in accordance with the invention were first stored for 1 to 8 days at 20 to 60° C. and then immersed for 60 minutes in the dyeing solution prepared in accordance with 5.1, the boiling temperature being maintained. The test specimens were then removed from the bath and rinsed with water first for 5 minutes at 50° C. and then for another 5 minutes at 20° C. The dyeing results were visually evaluated by a panel of examiners using a "school marking system". The individual values ("marks") have the following meanings: 1=very good, 2=good, 3=satisfactory, 4=adequate, 5=poor, 6=inadequate. The value "1" corresponds to the mark awarded in the corresponding dyeing of cotton while the value "6" corresponds to the mark awarded in the dyeing of untreated polypropylene.

The test results are set out in Table 3 below. All the results are average values from five tests.

TABLE 3

Dyeing tests with basic dye (dyeing solution C)

| No. | Additive (I) | Transition metal compound II | Storage Days | ° C. | Dye | Result (mark) |
|---|---|---|---|---|---|---|
| Comp. | None | None | 1 | 20 | Dye 3 | 6 |
| Comp. | None | None | 6 | 20 | Dye 3 | 6 |
| Comp. | None | None | 1 | 60 | Dye 3 | 6 |
| Comp. | None | None | 6 | 60 | Dye 3 | 6 |
| B27 | Soya oxazoline | Pb-C8 | 3 | 20 | Dye 3 | 3 |
| B28 | Soya oxazoline | Pb-C8 | 8 | 60 | Dye 3 | 2 |
| B29 | Soya oxazoline | Niacac | 3 | 20 | Dye 3 | 3 |
| B30 | Soya oxazoline | Niacac | 8 | 60 | Dye 3 | 2 |
| B31 | Soya oxazoline | Cu-sol | 3 | 20 | Dye 3 | 3 |
| B32 | Soya oxazoline | Cu-sol | 8 | 60 | Dye 3 | 2 |
| B33 | Ricinol oxazoline | Pb-C8 | 8 | 60 | Dye 3 | 2 |
| B34 | Ricinol oxazoline | Niacac | 8 | 60 | Dye 3 | 2 |
| B35 | Ricinol oxazoline | Cu-sol | 3 | 20 | Dye 3 | 3 |
| B36 | Ricinol oxazoline | Cu-sol | 8 | 60 | Dye 3 | 2 |
| B37 | Comperlan F | Cu-sol | 7 | 60 | Dye 3 | 3 |

TABLE 3-continued

Dyeing tests with basic dye (dyeing solution C)

| No. | Additive (I) | Transition metal compound II | Storage Days | °C. | Dye | Result (mark) |
|---|---|---|---|---|---|---|
| B38 | Edenor HTiCT | Cu-sol | 2 | 20 | Dye 3 | 3 |
| B39 | Edenor HTiCT | Cu-sol | 7 | 60 | Dye 3 | 4 |
| B40 | Edenor HTiCT | Pb-C8 | 2 | 20 | Dye 3 | 3 |
| B41 | Edenor HTiCT | Pb-C8 | 7 | 60 | Dye 3 | 4 |

What is claimed is:

1. A composition comprising:
   (a) a polyolefin;
   (b) from 0.01 to 10% by weight, based on the weight of the polyolefin, of a migratable amphiphile, excluding phenolic and sulfur-containing stabilizers and n-octyl phenyl salicylate; and
   (c) from 0.01 to 1000 ppm of a transition metal, based on the weight of the polyolefin.

2. The composition of claim 1 wherein the amphiphile has a molecular weight of from 50 to 3000 daltons.

3. The composition of claim 1 wherein the amphiphile has an iodine value of from 10 to 200.

4. The composition of claim 1 wherein the amphiphile contains a substituent of high polarity selected from the group consisting of a carboxyl group, a hydroxyl group, an amino group, an oxazoline group, an imidazoline group, an epoxide group, an isocyanate group, and derivatives thereof.

5. The composition of claim 1 wherein the transition metal is employed in the form of a transition metal salt.

6. The composition of claim 1 wherein the transition metal is present in the composition in an amount of less than 5 ppm, based on the weight of the polyolefin.

7. The composition of claim 1 wherein the transition metal is selected from the group consisting of lead, nickel, zirconium, chromium, titanium, tin, and mixtures thereof.

8. The composition of claim 1 wherein the polyolefin is selected from the group consisting of polyethylene, polypropylene, and mixtures thereof.

9. The composition of claim 1 wherein the amphiphile and transition metal are present in the composition in a ratio by weight of from 10:0.1 to $10:10^{-7}$.

10. A process for making a polyolefin in composition having improved dye compatibility comprising:
    (a) providing a polyolefin;
    (b) providing from 0.01 to 10% by weight, based on the weight of the polyolefin, of a migratable amphiphile, excluding phenolic and sulfur-containing stabilizers and n-octyl phenyl salicylate;
    (c) providing from 0.01 to 1000 ppm of a transition metal, based on the weight of the polyolefin; and
    (d) combining (a)–(c) to form the polyolefin composition.

11. The process of claim 10 wherein the amphiphile has a molecular weight of from 50 to 3000 daltons.

12. The process of claim 10 wherein the amphiphile has an iodine value of from 10 to 200.

13. The process of claim 10 wherein the amphiphile contains a substituent of high polarity selected from the group consisting of a carboxyl group, a hydroxyl group, an amino group, an oxazoline group, an imidazoline group, an epoxide group, an isocyanate group, and derivatives thereof.

14. The process of claim 10 wherein the transition metal is employed in the form of a transition metal salt.

15. The process of claim 10 wherein the transition metal is present in the composition in an amount of less than 5 ppm, based on the weight of the polyolefin.

16. The process of claim 10 wherein the transition metal is selected from the group consisting of lead, nickel, zirconium, chromium, titanium, tin, and mixtures thereof.

17. The process of claim 10 wherein the polyolefin is selected from the group consisting of polyethylene, polypropylene, and mixtures thereof.

18. The process of claim 10 wherein the amphiphile and transition metal are present in the composition in a ratio by weight of from 10:0.1 to $10:10^{-7}$.

19. The process of claim 10 wherein (a)–(c) are combined by a method selected from the group consisting of extrusion, calendering, and injection molding, at a temperature of from 180 to 320° C.

20. The process of claim 10 further comprising subsequently dyeing the polyolefin composition.

* * * * *